United States Patent [19]

Plummer

[11] Patent Number: 4,648,757

[45] Date of Patent: Mar. 10, 1987

[54] PRECISION ADJUSTMENT SYSTEM FOR BORING TOOLS

[75] Inventor: Harvey R. Plummer, Fond du Lac, Wis.

[73] Assignee: AMCA International Corporation, Fond du Lac, Wis.

[21] Appl. No.: 442,625

[22] Filed: Nov. 18, 1982

[51] Int. Cl.⁴ .......................................... B23B 47/18
[52] U.S. Cl. ...................................... 408/12; 408/13; 408/161; 408/170
[58] Field of Search ................. 408/13, 3, 4, 12, 10, 408/150, 161, 162, 169, 170, 171, 168; 29/568, 57; 364/474; 82/1.2

[56] References Cited

U.S. PATENT DOCUMENTS

| | | |
|---|---|---|
| 1,872,667 | 8/1932 | Bryant . |
| 2,042,257 | 5/1936 | Harrison et al. . |
| 2,457,040 | 12/1948 | Hall .................................... 408/170 |
| 2,632,956 | 3/1953 | Crosby . |
| 2,831,387 | 4/1958 | Ovshinsky . |
| 2,998,737 | 9/1961 | Yogus et al. . |
| 3,254,548 | 6/1966 | Gersch ................................ 408/150 |
| 3,279,285 | 10/1966 | Ivins .................................... 408/3 |
| 3,499,352 | 3/1970 | Milewski et al. . |
| 3,740,161 | 6/1973 | Milewski . |
| 3,899,724 | 8/1975 | Colton .................................. 408/13 |
| 3,914,678 | 10/1975 | Chynoweth et al. . |
| 4,055,386 | 10/1977 | Chynoweth et al. . |
| 4,118,139 | 10/1978 | Lemelson ............................. 408/12 |
| 4,181,958 | 1/1980 | Juengel et al. . |
| 4,204,782 | 5/1980 | Spits et al. . |
| 4,223,260 | 9/1980 | Beer et al. . |
| 4,268,783 | 5/1981 | Murray . |
| 4,354,305 | 10/1982 | Plummer et al. ..................... 29/568 |
| 4,400,118 | 8/1983 | Yamakage et al. .................. 364/474 |
| 4,412,465 | 11/1983 | Wright ................................. 82/1.2 |
| 4,416,569 | 11/1983 | Yamakage et al. .................... 408/4 |
| 4,473,937 | 10/1984 | Ortlieb ................................. 29/568 |

FOREIGN PATENT DOCUMENTS

| | | |
|---|---|---|
| 0043920 | 12/1981 | European Pat. Off. . |
| 2012643 | 10/1971 | Fed. Rep. of Germany ....... 408/161 |
| 2123272 | 9/1972 | France .................................. 408/13 |
| 902582 | 8/1962 | United Kingdom . |
| 1363851 | 8/1974 | United Kingdom . |
| 2024671 | 6/1982 | United Kingdom . |
| 629040 | 10/1978 | U.S.S.R. ............................... 408/13 |

OTHER PUBLICATIONS

Flexible Mfg. The Technology Comes of Age, *Iron Age*, pp. 82-91, Sep. 7, 1981.
Valenite publn KA-102, dated Aug. 1978 "Now . . . Valenite's Kamset Automatic Size Control System".
Valeron Speed Auto Compensation (SAC) Operating Manual, dated Aug. 10, 1981.
Sandvik brochure "Machining Systems—Functional Description Sandvik Autocomp System–Control Units, Compensators, Tooling".
Genicon & Samsomatic Ltd brochure "Our Tool Correction Systems" dated Aug. 1980.
Sep. 7, 1981 issue of *Iron Age*, p. 83.
Renishaw brochure "3 Dimensional Touch Trigger Probes for Machining Centres and Lathes".

*Primary Examiner*—William R. Briggs
*Attorney, Agent, or Firm*—Leydig, Voit & Mayer

[57] ABSTRACT

A system is disclosed for automatic radial adjustment of a boring tool in a machine tool spindle to accurately size a bore in a workpiece within extremely close tolerances over a wide range of bore sizes. The system includes a boring tool mounting a toolholder and cutter and a precision adjusting means for setting the radial position of the cutter, the precision adjusting means including an adjusting wedge housed within said boring bar and being threaded to a precision lead screw which is rotated for axial translation of the adjusting wedge, the wedge and toolholder having intermeshing toothed serrations axially skewed for radial movement of the toolholder in response to axial translation of the adjusting wedge; an adjusting actuator adapted for operative engagement with driver means on said precision lead screw; a probe which measures the size of a preliminary bore in the workpiece; an adjusting control operatively connected to the actuator for altering the radial position of the cutter and toolholder; and means for setting the adjusting control to effect an adjustment in the radial position of the toolholder and cutter by an amount proportional to the deviation between the size of the preliminary bore and the size of the final bore to be generated in the workpiece. The system may be used in any manual or numerically controlled machine capable of performing boring operations.

4 Claims, 10 Drawing Figures

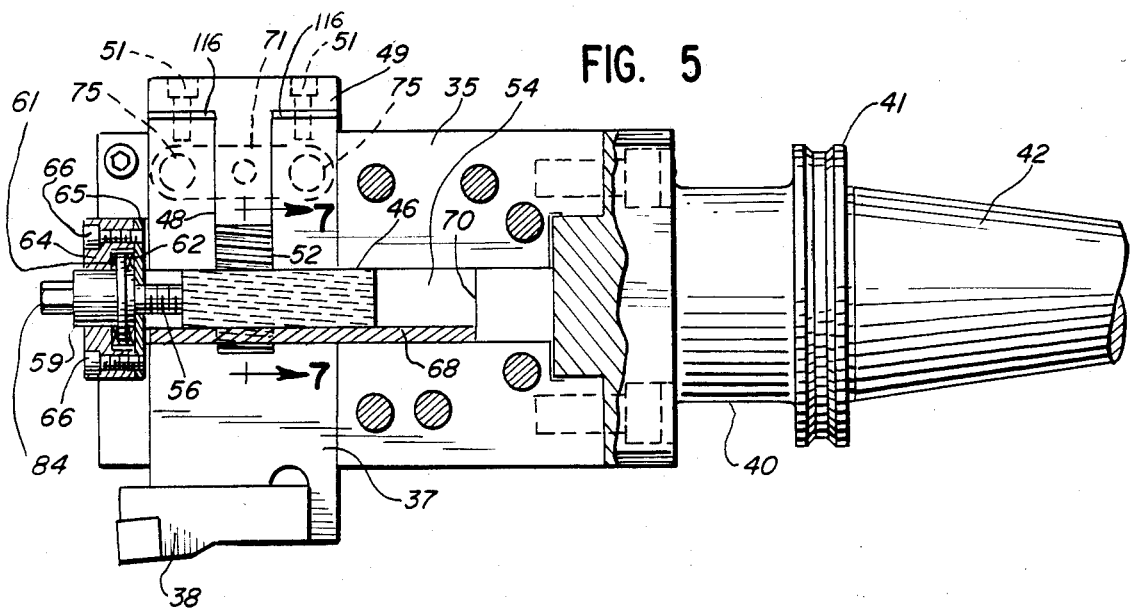
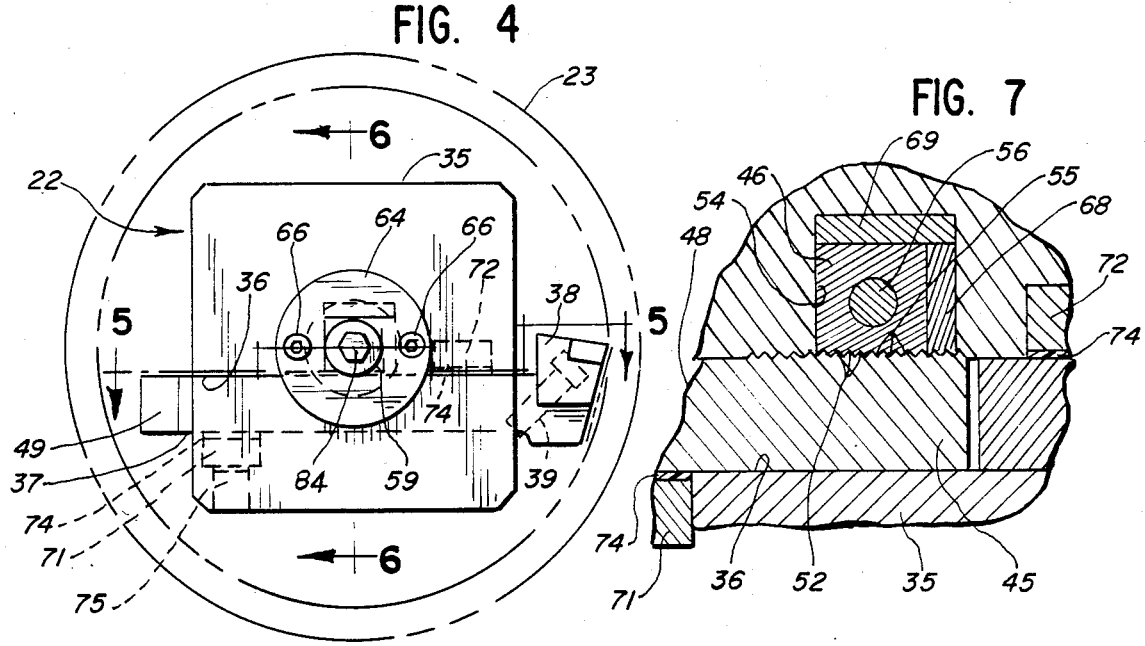
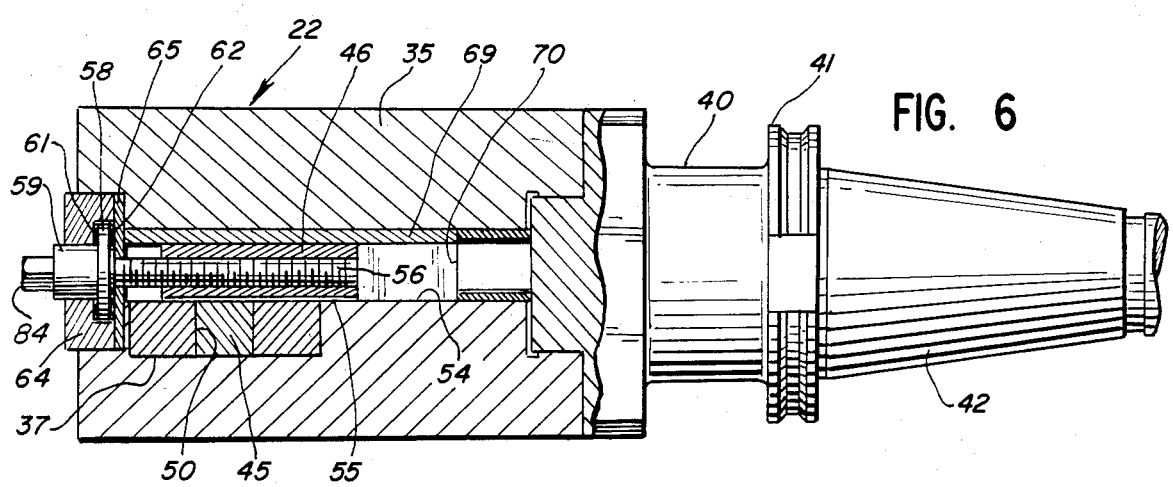

PRECISION ADJUSTMENT SYSTEM FOR BORING TOOLS

BACKGROUND OF THE INVENTION

The present invention relates in general to a system for adjustment of a boring tool drivingly mounted in a machine tool spindle and, more specifically, to a system for automatic adjustment of the boring tool to accurately size bores within extremely close tolerances over a wide range of bore sizes. While the invention finds particular utility in machining centers, it can also be used efficiently in any manual or numerically controlled machine capable of performing boring operations.

Various prior arrangements for sizing bores have existed in the machine tool art for many years. Such arrangements have a number of disadvantages not present in the system of the present invention. Some of these arrangements compensate only for tool wear. Others have an extremely limited range of adjustment. Still others require complex mechanisms which require a single purpose spindle rather than a general purpose one. Still others are not readily compatible with the numerical control of a machine tool.

BRIEF SUMMARY OF THE INVENTION

The general aim of the present invention is to provide a versatile system for automatic adjustment of a boring tool in a conventional machine tool spindle and capable of operating satisfactorily over a wide range of bore sizes with a high degree of accuracy.

A more specific object of the invention is to provide a system for automatic adjustment of a boring tool of the foregoing type to accurately size a bore through a range of bore sizes running from 1.9 inches and up in diameter.

Another object of the invention is to provide a system of the foregoing character utilizing its own adjusting control and susceptible of use with any manual or numerically controlled machine tool capable of carrying out boring operations.

A further object is to provide an automatic adjusting system of the type set forth above including interlock means for precluding adjustment in the absence of complete engagement of the adjusting means, and for initiating an engage cycle prior to an adjust cycle.

Still another object is to provide an automatic adjusting system of the above type with provision for eliminating backlash from the adjusting motion.

Other objects and advantages will become apparent as the following detailed description proceeds, taken with the accompanying drawings identified below.

BRIEF DESCRIPTION OF THE DRAWINGS

FIG. 4 is an enlarged elevational view of the outer end of the boring tool showing the hexagonal end of the precision adjusting screw and the transversely disposed toolholder and cutter.

FIG. 5 is a horizontal sectional view taken longitudinally of the boring tool in the plane of the line 5—5 in FIG. 4.

FIG. 6 is a vertical sectional view taken axially of the boring tool in the plane of the line 6—6 in FIG. 4.

FIG. 7 is a further enlarged fragmentary sectional view taken transversely through a portion of the boring tool in the plane of the line 7—7 in FIG. 5.

Figure 1:
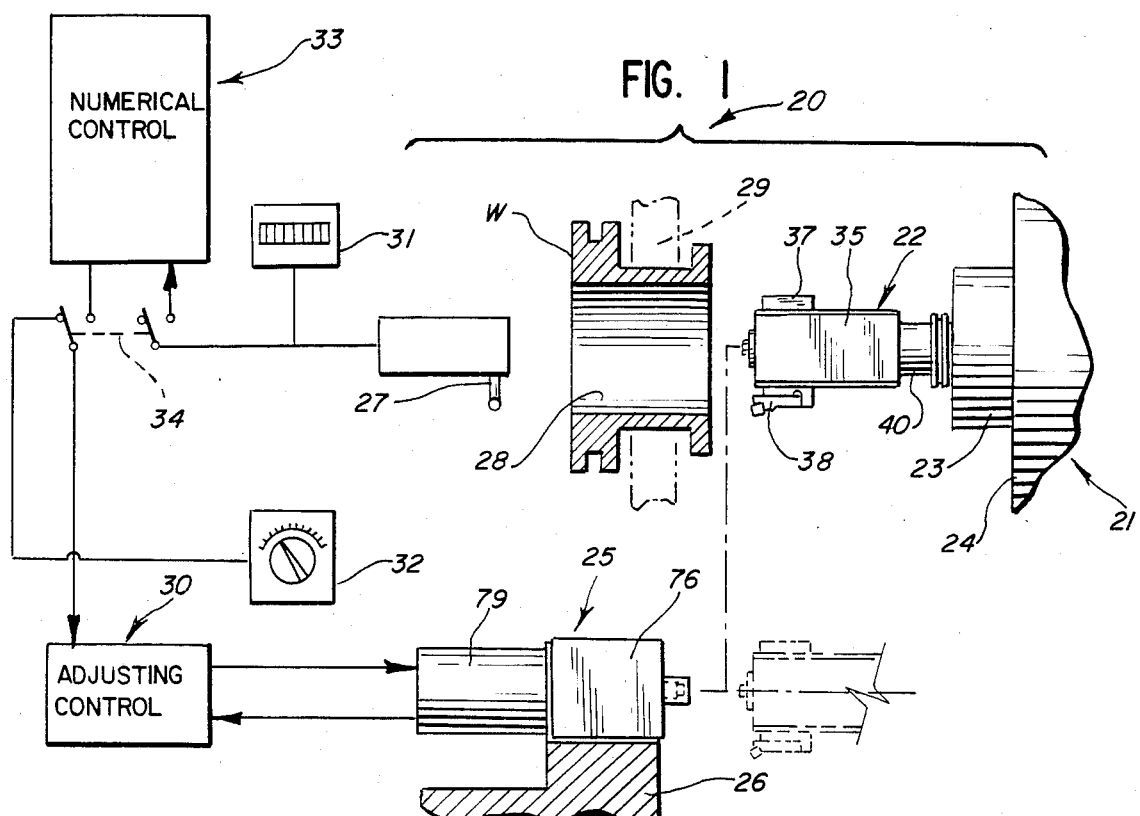
FIG. 1 is a diagramatic view of an illustrative system embodying the present invention and showing the machine tool spindle, boring tool, workpiece, precision adjusting actuator, size probe, and system controls.
Figure 2:
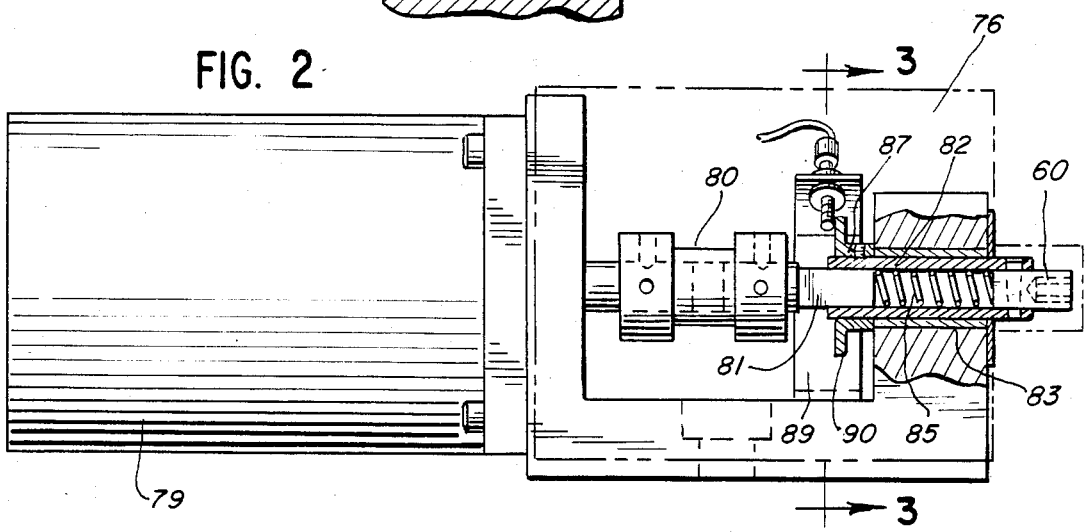
FIG. 2 is an enlarged side elevational view of the adjusting actuator with a portion of the mechanism shown in axial section.

While the invention is susceptible of various modifications and alternative constructions, certain preferred embodiments have been shown in the drawings and will be described below in considerable detail. It should be understood, however, that there is no intention to limit the invention to the specific forms described but, on the contrary, the intention is to cover all modifications, alternative constructions and equivalents falling within the scope of the appended claims.

DETAILED DESCRIPTION OF THE INVENTION

Referring more specifically to FIG. 1, the invention is there exemplified in a system 20 shown diagramatically in the environment of a machine tool 21. The system 20 comprises a boring tool 22 drivingly mounted in spindle 23 of the machine tool headstock 24; an adjusting actuator 25 for accurately sizing the boring tool 22 and which may be mounted on the machine tool table 26; an electronic gage or probe 27 or other measurement means adapted to measure precisely the diameter of the bore 28 in workpiece W, the latter being secured in an appropriate workholder 29 on the machine tool table; and an electronic adjusting control 30 for operating the adjusting actuator 25. The adjusting control 30 may be operated either manually by means of bore size readout 31 and manual size control device 32, or automatically by means of an appropriate interface with numerical control 33 of machine tool 21. In the present instance, selection between manual and automatic operation of the adjusting control 30 may be made by mode selector switch 34.

The boring tool 22 (FIGS. 1 and 5-8) in this case comprises an elongate body 35 of substantially square cross section. The body is formed with a large transverse slot 36 which slideably houses a block type toolholder 37 carrying a cutter 38 fixed thereto as by clamp screw 39. The cutter 38 may include an insert of tungsten carbide or other hard material. The toolholder 37, including its cutter 38, is disposed for adjustment radially of the boring tool body 35. The body is bolted or otherwise rigidly fixed to an adapter 40 having a gripping flange 41 and a tapered shank 42 drivingly mounted in the spindle 23 of the machine tool.

For the purpose of effecting accurate radial adjustment of the toolholder 37 and cutter 38, adjustment means in the form of a self-locking wedge mechanism 44 is provided in the boring tool 22. The mechanism 44 comprises a pair of interconnected wedges 45, 46, one mounted on the toolholder 37 and the other on the boring tool body 35.

The wedge 45, of generally T-shaped configuration, is mounted on the toolholder. It comprises a central stem 48 and a cross member 49. The stem 48 is of generally square cross section and fits into a relatively large longitudinal slot 50 in the toolholder. The slot 50 is also of generally square cross section and engages the stem 48 with a relatively tight fit. The wedge 45 is rigidly fixed to the toolholder by means of the cross member 49 which abuts snugly against the end of the toolholder remote from the cutter. The cross member is secured to the toolholder as by cap screws 51.

As detailed more particularly in FIGS. 5–7, the central stem 48 has a slightly raised portion extending from its central area to the end remote from the cross member 49. A plurality of relatively fine, thread-like serrations 52 are defined in the raised portion of the stem 48. The serrations 52 extend transversely of the stem 48, are evenly spaced, and are parallel to each other. Each serration has a cross section of truncated triangular form, its sides subtending an angle of approximately 60°. The pitch distance between serrations is on the order 0.050". The serrations 52 are skewed by an angle on the order of 6°50' with respect to the plane of the cross member 49.

The mating adjusting wedge 46, of generally rectangular block-like form, is mounted on the boring tool body 35. It is disposed for axial sliding movement in a longitudinal guideway 54 within the body 35. The wedge 46 is formed on its underside with a series of longitudinal serrations 55 having the same configuration as the serrations 52 of wedge 45. In this instance, the serrations 55 are skewed at an angle of approximately 6°50' with respect to the longitudinal axis of the wedge 46. The serrations 55 are adapted to mesh with the serrations 52 when the toolholder 37 is situated in the transverse slot 36 and the wedge 46 is situated within the guideway 54. In this condition, the wedges 45, 46 are disposed at right angles to each other.

For the purpose of effecting radial adjustment of the toolholder 37 and cutter 38 in the boring tool body 35, a precision adjusting means is provided (FIGS. 4–8). Such means comprises a precision lead screw 56 having a fine pitch ground thread thereon. The latter is disposed in threaded engagement with corresponding fine pitch threads formed in the axial bore of the adjusting wedge 46. Adjacent its outer end, the lead screw 56 has a restraining flange 58 and an enlarged head 59 with a hexagonal tool engaging stud 84 defined thereon. The stud 84 will be referred to herein as "tool hex 84" or "hex 84". The lead screw is held captive in the boring tool body by means of a pair of roller thrust bearings 61, 62, a retainer cap 64, and a thrust washer 65. The retainer cap and thrust washer 64, 65, are secured together as by means of cap screws 66.

In order to achieve a close sliding fit between the adjusting wedge 46 and the longitudinal bore 50 of the toolholder, a bronze metal shoe 68 is inserted between one side of the adjusting wedge 46 and the bore 50. Similarly, a bronze shoe 69 is inserted between the top of the wedge 46 and the top surface of the bore 50 (FIGS. 5–7). The shoes 68, 69 extend for the full length of travel of the adjusting wedge 46 within the bore 50. They thus extend from the thrust washer 65 to a positive stop 70 defined by a square sleeve at the opposite end of the bore 50. The stop 70 limits the inward axial travel of the wedge 46.

In order to stabilize the axial motion of adjusting wedge 46 and the radial motion of adjusting wedge 45 along with toolholder 37 and cutter 38, provision is made for introducing a controlled amount of friction into the wedge mechanism 44. This is accomplished in the present case by the use of a pair of oblong friction plates 71, 72 faced with a layer 74 of non-metallic material, in this instance known by the trademark "RULON" (FIGS. 4, 5, 7). Controlled friction is maintained between each plate 71, 72 and the toolholder by means of a pair of adjustable Belleville springs 75.

By reason of the construction described above, one revolution of the precision lead screw will move the adjusting wedge 46 axially a distance of 0.04166 inch. This increment of axial motion of the wedge 46 will move the cutter 38 and its toolholder radially a distance of 0.005 inch.

Turning next to the adjusting actuator 25 (FIGS. 1–3 and 8), it will be noted that the same comprises an electronic wrench 76 driven by adjusting control 30. The wrench 76 may be mounted on the machine tool table 26, the matrix of a tool changer, or other convenient location. The wrench includes a stepping motor drive 79, in this instance connected via a sleeve coupling 80 to driver 81 and telescoping sleeve 82 of socket wrench 60. The driver 81 is of square cross section and slideably engages a correspondingly shaped recess in the end of the sleeve 82, enabling the sleeve 82 to move telescopically with respect to the driver 81. A relatively heavy biasing spring 85 is interposed between the driver 81 and the sleeve 82. The sleeve 82 is journaled in a plain bearing 83 in the actuator frame and retained against the pressure of the spring 85 by means of collar 87. This spring loaded connection, combined with a taper on the hexagonal tool stem "hex" 84 of the precision lead screw, allows the socket wrench 60 to assume the proper axial position on the hex 84 of the precision lead screw even if the wrench initially lacks the proper angular orientation with respect to the hex 84.

For the purpose of insuring full engagement between the socket wrench 60 and the lead screw hex 84 before tool adjustment takes place, a full engagement interlock 86 is provided. The interlock in this case comprises a proximity switch 88 mounted on a bracket 89 fixed to the frame of the actuator 25. The body of the switch 88 extends radially toward the rotational axis of the wrench. A metal flange 90, affixed to the sleeve 82 of the wrench, serves as the actuator for the proximity switch 88. The parts are so arranged so that when the wrench 60 contacts the tool hex 84 of the lead screw without having the proper angular orientation for registration with the latter, the collar 90 will be approximately coplanar with the proximity switch 88. This causes the proximity switch to signal the adjusting control 30 that the wrench and lead screw hex are not properly oriented for engagement. The signal also initiates an engage cycle, i.e., a small rotational motion of the wrench 60 to bring about engagement. As soon as the socket wrench 60 becomes fully engaged on the hex 84, the proximity switch sends a further signal to the adjusting control 30 that the adjust cycle can begin.

The adjusting control 30 (FIG. 1), operates the adjusting actuator 25 in accordance with bore size information from the workpiece W. In most instances, such information will be obtained through electronic probe 27 and its readout 31. When operating in the manual mode, the operator will note the actual preliminary bore size shown in readout 31, compare it with the final bore size specified for the workpiece W, and note the difference. He will then set the manual size selector switch 32 in accordance with the difference in bore size to be removed from the workpiece and this information is conveyed to the adjusting control 30. The adjusting control then initiates an adjust cycle to be carried out by the actuator 25 and its wrench mechanism 76. The stepping motor drive 79 of the wrench mechanism 76 is adapted to apply 400 increments of adjustment, per revolution, to the wrench. Each stepping motor increment results in a cutter adjustment increment of 0.000025 inch on the bore diameter.

Figure 3:
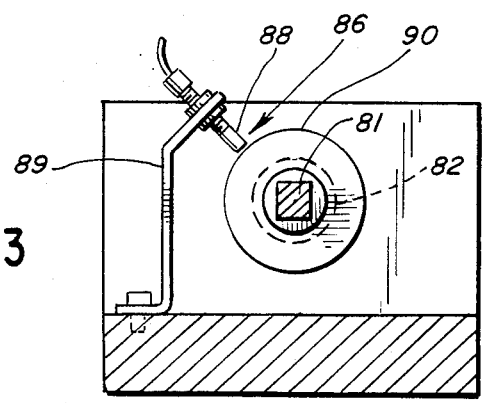
FIG. 3 is a transverse sectional view taken through the actuator mechanism in the plane of the line 3—3 in FIG. 2.
Figure 8:
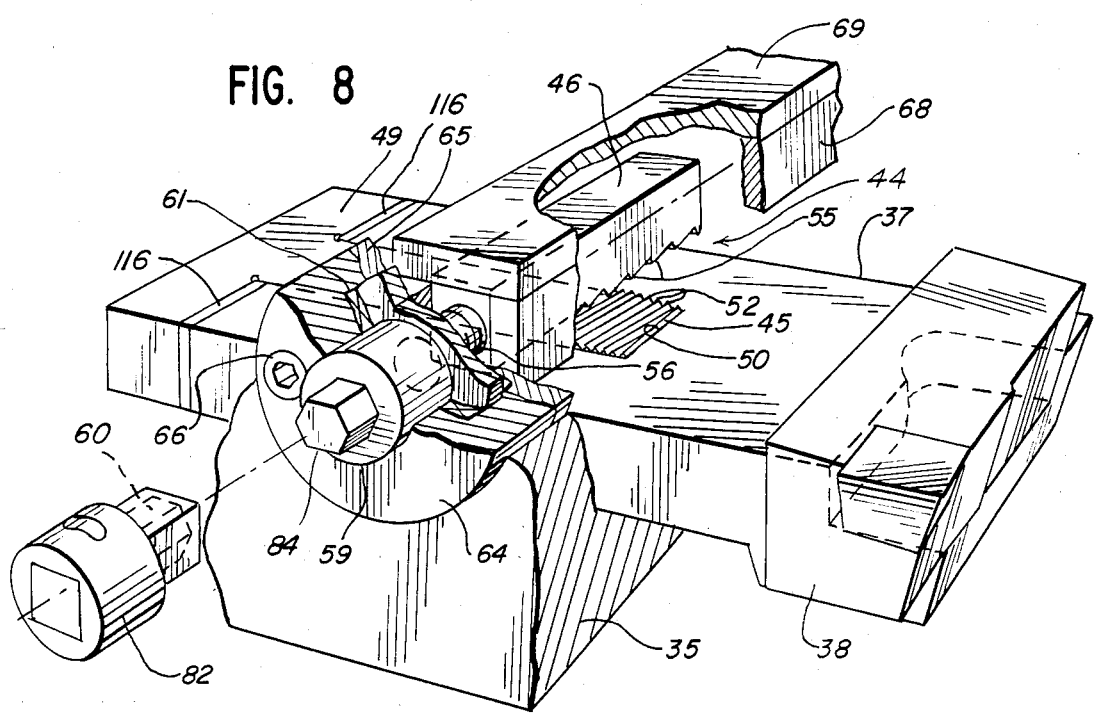
FIG. 8 is an enlarged fragmentary perspective view showing a portion of the boring tool, the block type toolholder and cutter, and details of the adjusting mechanism including a portion of the adjusting actuator.

The adjust cycle includes moving the headstock and/or the machine tool table to align the adjusting actuator socket wrench 60 and the hex 84 of the boring tool lead screw; engaging the socket wrench 60 and lead screw hex 84; operating the stepping motor drive 79 and socket wrench 60 in a clockwise direction as viewed in FIG. 3 through the necessary angular displacement to adjust the boring cutter 38 to the required diameter for the final bore. Assuming that the boring cutter is to be adjusted to increase the size of the bore, the stepping motor drive 79 and socket wrench 60 will turn the lead screw hex 84 clockwise through the necessary angular increment or increments to make the adjustment. Subsequent adjustments to increase bore size will be made in the clockwise direction, thereby avoiding backlash.

When the boring cutter must be adjusted to decrease the size of the bore, a modified procedure is followed but final adjustment of the lead screw 56 is still made in the clockwise direction. Under this condition, the adjusting control is programmed to operate the stepping motor drive 79 to turn the lead screw 56 in a counterclockwise direction for two revolutions thereof. The drive 79 and lead screw 56 are then reversed and driven in a clockwise direction until the required setting of the boring cutter has been reached. This reversal avoids any backlash problem.

The adjust cycle may be interrupted by action of the interlock 86 if the angular orientation of the socket wrench 60 does not correspond to that of the lead screw hex 84 when these members are first brought into contact with each other. In such event, as previously noted, an engage cycle is triggered by the proximity switch 88 to correct the angular orientation and permit full engagement of the wrench 60 and lead screw hex 84. As soon as full engagement occurs, the proximity switch 88 causes the adjust cycle to resume.

Referring again more specifically to FIG. 1, in situations where the machine tool has a numerical control 33, the probe 27 and adjusting control 30 may be interfaced with the numerical control. In the present instance, this may readily be accomplished through mode selector switch 34. Upon shifting the position of the switch 34 from that shown in FIG. 1 to its alternative position, the size information from the probe 27 may be transmitted directly to the numerical control which will then process it in a well-known manner and provide an appropriate signal to the adjusting control 30 to carry out the precise adjustment required for obtaining the final bore size in the workpiece.

Figure 9:
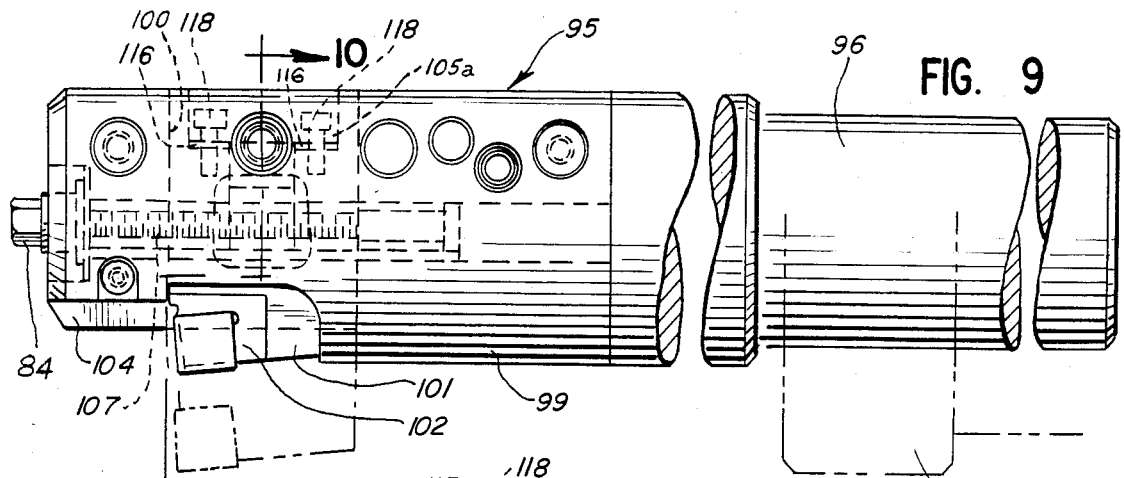
FIG. 9 is a plan view of another form of boring tool also embodying the present invention and which is adapted for boring diameters somewhat smaller than the boring tool shown in FIGS. 4-8.
Figure 10:
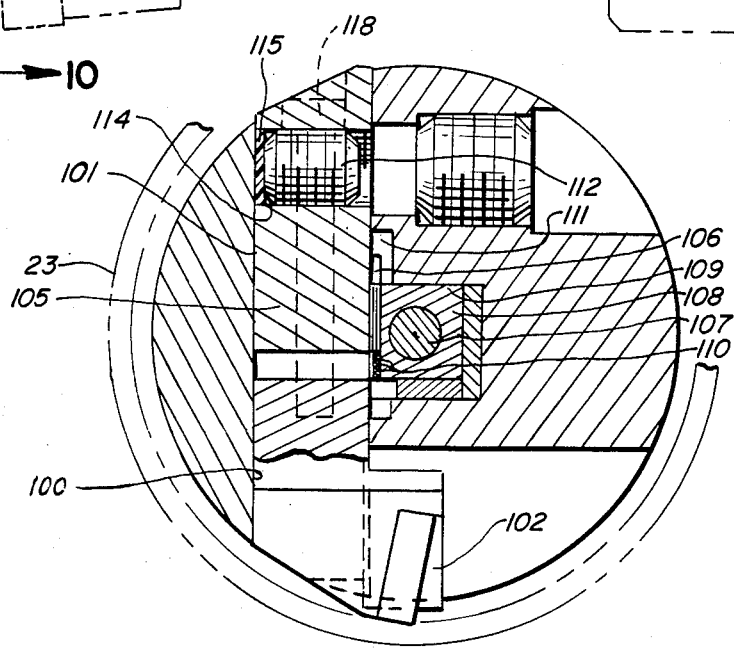
FIG. 10 is an enlarged broken sectional view taken transversely of the boring tool shown in FIG. 9 and in the plane of the line 10—10.

Turning next to FIGS. 9 and 10, an illustrative boring tool 95 is there shown which also embodies the present invention. The boring tool 95 is generally similar to the boring tool 22 described earlier herein and may be used with the same system components shown in FIG. 1. The boring tool 95 is of substantially smaller diameter than the tool 22, however, being adapted for use in generating bores ranging from approximately 1.90 inches to 3.20 inches in diameter. In this instance, the tool 95 has a cylindrical shank 96 adapting it for mounting in a machine tool spindle by means of a suitable adapter 98.

The boring tool 95 comprises a generally cylindrical body 99 having a transverse slot 100 slideably housing a block-type toolholder 101. The latter carries a cutter 102 which includes a hardened insert of cemented carbide or the like. The outboard end portion of the body 99 adjacent the cutter has a relieved area 104 which facilitates chip clearance since the toolholder and cutter are mounted axially inward a short distance from the outer end of the body 99. A self-locking wedge mechanism similar to the mechanism 44 described above is used for adjusting the radial position of the toolholder and cutter 101, 102.

The central portion of the toolholder 101 includes an integral adjusting wedge 105 having a raised section with transverse serrations 106 similar to those of the adjusting wedge 45 described earlier herein. Like the wedge 45, the adjusting wedge 105 is of generally T-shaped configuration with an integral cross member 105a for securing it to the toolholder 101. A co-acting adjusting wedge 108, similar to the wedge 46, is slideably mounted in a longitudinal guideway 109 in the boring tool body similar to the guideway 54 described above. The wedge 108 has a plurality of longitudinal serrations 110 defined in its underside. The serrations 110 are adapted to mesh with the transverse serrations 106 of the toolholder to adjust the latter radially in response to longitudinal movement of the adjusting wedge 108.

A precision lead screw 107, similar to the lead screw 56 described above, is utilized to move the adjusting wedge 108 longitudinally of the guideway 109 and thereby effect radial movement of the toolholder and cutter through adjusting wedge 105. The lead screw 107 has a tool hex 84 engageable by socket wrench 60 of the wrench mechanism 76. To facilitate such radial movement and avoid interference between the body 99 and the transverse serrations 106 on the toolholder, a substantially flat rectangular clearance recess 111 is formed in the boring tool body.

To stabilize the adjusting motion of the toolholder 101 and cutter 102 in the transverse slot 100, a controlled amount of friction is introduced. This is accomplished by means of a threaded plug 112 housed in a threaded vertical bore 114 running through the toolholder 101. A disc 115 of non-metallic material, in this instance known under the trademark "RULON" is interposed between the bottom of the plug 112 and the bottom surface of the transverse slot 100. The plug 112 may be tightened against the plastic disc 115 to provide the desired amount of friction.

For the purpose of accommodating the boring tool 95 to the range of bore sizes required, the position of the adjusting wedge 105 may be varied with respect to the toolholder 101. Accordingly, a pair of spacers 116 of appropriate size for the bore to be machined may be interposed between the cross member 105a and the toolholder 101. The parts are then secured together by means of cap screws 118. In the present instance, it has been found feasible to utilize the toolholder 101 without spacers for one part of the bore size range; with one pair of spacers having a thickness of 0.050" for another part of the size range; and with two such pairs of spacers for the remaining part of the size range.

As indicated earlier herein, the system of the present invention is capable of providing automatic adjustment of a boring tool to accurately size a bore through a range of bore sizes running from 1.9 inches and up in diameter. Its performance parameters within this range are as follows:

| | |
|---|---|
| Unidirectional Accuracy | ±0.0005 in. on diameter |
| Unidirectional Repeatability | ±0.00015 in. on diameter |
| Resolution Input | 0.0001 in. on diameter |
| Resolution Display | 0.0001 in. on diameter |
| Inches per step at tool | 0.000025 in. on diameter |
| Compensation Time | |
| .400 in. adjustment | 8.0 seconds |
| .001 in. adjustment | 0.5 seconds |

I claim as my invention:

1. A machine tool having a power driven spindle, a work support adapted to hold a workpiece, and a system for radial adjustment of a boring tool to accurately size a bore in the workpiece, said system comprising, in combination: a boring tool adapted for mounting in the spindle of said machine tool; a toolholder and cutter disposed transversely and generally radially of said boring tool; precision adjusting means in said boring tool for setting the radial position of said toolholder and cutter, said precision adjusting means including an adjusting wedge housed within said boring tool and disposed for sliding movement axially thereof, a precision lead screw disposed in threaded engagement with said adjusting wedge and adapted to move said adjusting wedge axially of said boring tool, means for holding said lead screw captive against relative axial movement with respect to said boring tool while permitting relative rotary movement with respect to said boring tool, means defining toothed serrations on said adjusting wedge, and means defining toothed serrations on said toolholder adapted to engage said serrations on said wedge, said means defining toothed serrations on said toolholder being fixed rigidly on said toolholder, and the toothed serrations on said adjusting wedge and on said toolholder being axially skewed to provide radial adjustment of said toolholder in response to said axial sliding movement of said adjusting wedge; a precision adjusting actuator adapted for engagement with driver means on said lead screw to change the radial position of said toolholder and cutter; an adjusting control connected to said actuator for causing said actuator to operate said precision adjusting means to alter the radial position of said toolholder and cutter by an amount proportional to the difference in size between a preliminary undersized bore in the workpiece and the final bore required therein; means defining a longitudinal slot in said toolholder commencing at the end remote from said cutter and terminating short of the end of where said cutter is situated; and a T-shaped insert rigidly secured to said toolholder, said insert comprising a longitudinal stem housed within said slot and a cross member abutting the end of said toolholder remote from the cutter; said means defining toothed serrations on said toolholder being defined in said longitudinal stem.

2. A machine tool as claimed in claim 1, which further comprises a spacer interposed between said cross member and said end of said toolholder remote from said cutter for varying the range of adjustment of said boring tool.

3. A machine tool having a power driven spindle, a work support adapted to hold a workpiece, and a system for radial adjustment of a boring tool to accurately size a bore in the workpiece, said system comprising, in combination: a boring tool adapted for mounting in the spindle of said machine tool; a toolholder and cutter disposed transversely and generally radially of said boring tool; precision adjusting means in said boring tool for setting the radial position of said toolholder and cutter, said precision adjusting means including an adjusting wedge housed within said boring tool and disposed for sliding movement axially thereof, a precision lead screw disposed in threaded engagement with said adjusting wedge and adapted to move said adjusting wedge axially of said boring tool, means for holding said lead screw captive against relative axial movement with respect to said boring tool while permitting relative rotary movement with respect to said boring tool, means defining toothed serrations on said adjusting wedge, the toothed serrations on said adjusting wedge and on said toolholder being axially skewed to provide radial adjustment of said toolholder in response to said axial sliding movement of said adjusting wedge; a precision adjusting actuator adapted for engagement with driver means on said lead screw to change the radial position of said toolholder and cutter; an adjusting control connected to said actuator for causing said actuator to operate said precision adjusting means to alter the radial position of said toolholder and cutter by an amount proportional to the difference in size between a preliminary undersized bore in the workpiece and the final bore required therein; and an interlock which precludes said actuator from operating said lead screw in the absence of full engagement between said actuator and said lead screw drive means, and initiates an engage cycle prior to an adjust cycle.

4. A machine tool having a power driven spindle, a work support adapted to hold a workpiece, and a system for radial adjustment of a boring tool to accurately size a bore in the workpiece, said system comprising, in combination: a boring tool adapted for mounting in the spindle of said machine tool; a toolholder and cutter disposed transversely and generally radially of said boring tool; precision adjusting means in said boring tool for setting the radial position of said toolholder and cutter, said precision adjusting means including an adjusting wedge housed within said boring tool and disposed for sliding movement axially thereof, a precision lead screw disposed in threaded engagement with said adjusting wedge and adapted to move said adjusting wedge axially of said boring tool, means for holding said lead screw captive against relative axial movement with respect to said boring tool while permitting relative rotary movement with respect to said boring tool, means defining toothed serrations on said adjusting wedge, and means defining toothed serrations on said toolholder adapted to engage said serrations on said wedge, the toothed serrations on said adjusting wedge and on said toolholder being axially skewed to provide radial adjustment of said toolholder in response to said axial sliding movement of said adjusting wedge; a precision adjusting actuator adapted for engagement with driver means on said lead screw to change the radial position of said toolholder and cutter; and an adjusting control connected to said actuator for causing said actuator to operate said precision adjusting means to alter the radial position of said toolholder and cutter by an amount proportional to the difference in size between a preliminary undersized bore in the workpiece and the final bore required therein; wherein said adjusting actuator further comprises, in combination: a frame; a stepping motor drive mounted on said frame and having a wrench driver; a sleeve jounaled in said frame and adapted to move telescopically relative to said wrench driver; a bar-type socket wrench fixed to one end of said sleeve; a biasing spring interposed between said telescoping sleeve and said wrench driver tending to separate said telescoping sleeve and said wrench driver; a collar fixed to the end portion of said telescoping sleeve remote from said bar-type socket wrench; and a proximity switch mounted on said frame in position to align itself with said collar in the event said bar-type socket wrench fails to engage fully the driver of said precision lead screw.

* * * * *